United States Patent
Chen et al.

(10) Patent No.: US 12,462,577 B2
(45) Date of Patent: Nov. 4, 2025

(54) METHOD AND SYSTEM FOR PROVIDING AN ESTIMATION OF A VEHICLE GEOMETRY OF A SURROUNDING VEHICLE, VEHICLE, AND COMPUTER-READABLE MEDIUM

(71) Applicant: Volvo Car Corporation, Gothenburg (SE)

(72) Inventors: Shuangshuang Chen, Gothenburg (SE); Tobias Johansson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 409 days.

(21) Appl. No.: 18/050,225

(22) Filed: Oct. 27, 2022

(65) Prior Publication Data
US 2023/0147400 A1 May 11, 2023

(30) Foreign Application Priority Data

Nov. 5, 2021 (EP) ..................................... 21206706
Nov. 5, 2021 (SE) .................................. 212067060

(51) Int. Cl.
*G06V 20/58* (2022.01)
*B60W 40/10* (2012.01)
(Continued)

(52) U.S. Cl.
CPC ............. *G06V 20/58* (2022.01); *B60W 40/10* (2013.01); *B60W 60/001* (2020.02); *G06V 20/625* (2022.01); *B60W 2420/403* (2013.01)

(58) Field of Classification Search
CPC .. G06V 20/58; G06V 20/625; G06V 2201/08; G06V 30/10; B60W 40/10; B60W 60/001; B60W 2420/403
See application file for complete search history.

(56) References Cited

U.S. PATENT DOCUMENTS 5,381,155 A 1/1995 Gerber
10,984,275 B1 * 4/2021 Campbell ........ H04N 21/42202
(Continued)

FOREIGN PATENT DOCUMENTS

CN 105702027 A 6/2016

OTHER PUBLICATIONS

Extended EP Search Report for EP Application No. 21206706.0 dated Apr. 29, 2022.
(Continued)

*Primary Examiner* — Dhaval V Patel
(74) *Attorney, Agent, or Firm* — Amin, Turocy & Watson, LLP

(57) ABSTRACT

The invention relates to a method for providing an estimation of a vehicle geometry of a surrounding vehicle (40). In a first step of the method, an image (I) of at least a portion of the surrounding vehicle (40) is received, the portion comprising a license plate (42) affixed to the surrounding vehicle (40). Next, the license plate (42) is detected within the received image (I) and the alphanumeric identification code of the license plate (42) is extracted. Subsequently, a vehicle geometry parameter (P) being linked to the alphanumeric identification code is requested from a database (36) via a wireless data connection (38). Thereafter, the vehicle geometry parameter (P) is received from the database (36) via the wireless data connection (38), and the vehicle geometry is estimated based on the received vehicle geometry parameter (P). Moreover, a system (12) for providing an estimation of a vehicle geometry of the surrounding vehicle (40) and a vehicle (10) comprising such as system are described. Furthermore, a computer-readable medium is presented.

20 Claims, 2 Drawing Sheets

Figure 1:
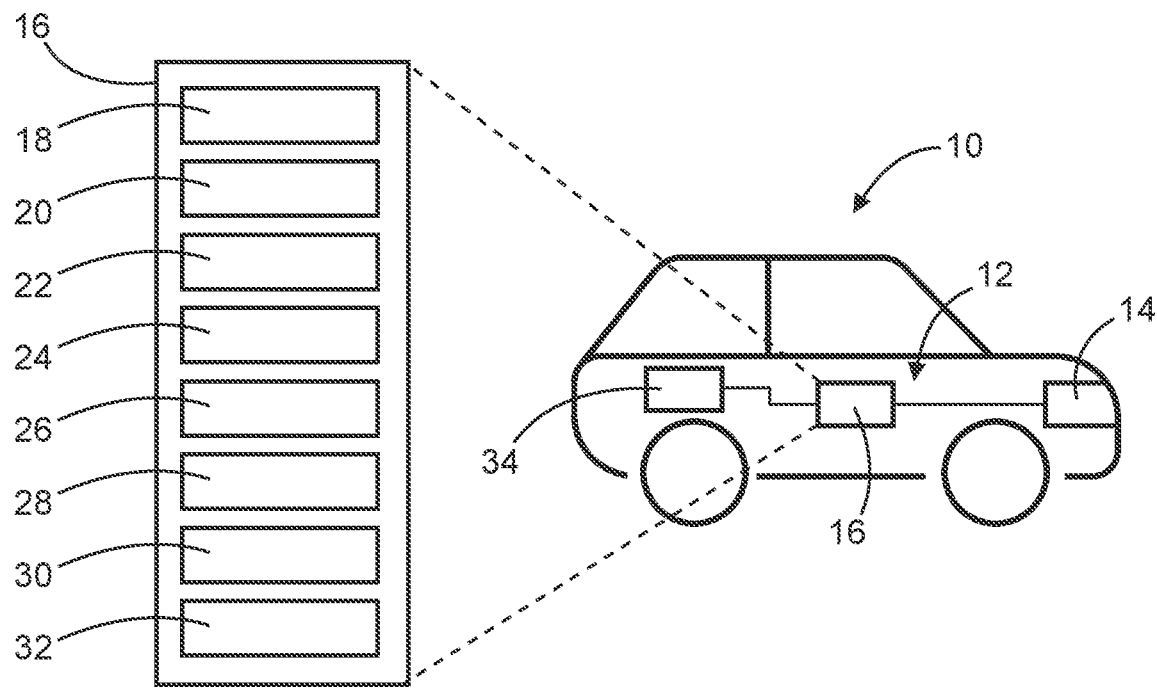

(51) Int. Cl.
*B60W 60/00* (2020.01)
*G06V 20/62* (2022.01)

(56) References Cited

U.S. PATENT DOCUMENTS

| | | | |
|---|---|---|---|
| 11,321,571 B2* | 5/2022 | Crary | G06V 20/46 |
| 11,381,161 B2* | 7/2022 | Lai | H02M 1/38 |
| 11,417,125 B2* | 8/2022 | Georgis | G06V 30/413 |
| 2017/0372161 A1* | 12/2017 | Almeida | G06F 18/256 |
| 2023/0206659 A1* | 6/2023 | Lee | G06T 7/90 |
| | | | 382/105 |

OTHER PUBLICATIONS

Communication pursuant to Article 94(3) EPC received for EP Patent Application Serial No. 21206706.0 dated Dec. 4, 2023, 5 pages.

First Office Action received for Chinese Patent Application Serial No. 202211225375.9 dated Feb. 22, 2025, 15 pages (Including English Translation).

* cited by examiner

METHOD AND SYSTEM FOR PROVIDING AN ESTIMATION OF A VEHICLE GEOMETRY OF A SURROUNDING VEHICLE, VEHICLE, AND COMPUTER-READABLE MEDIUM

CROSS-REFERENCE TO RELATED APPLICATIONS

This application claims the benefit of and priority to pending EP patent application serial number 21206706.0, filed Nov. 5, 2021 and entitled "METHOD AND SYSTEM FOR PROVIDING AN ESTIMATION OF A VEHICLE GEOMETRY OF A SURROUNDING VEHICLE, VEHICLE, AND COMPUTER-READABLE MEDIUM," the entirety of which is hereby incorporated by reference herein.

The present disclosure relates to a method for providing an estimation of a vehicle geometry of a surrounding vehicle.

Moreover, the disclosure is directed to a system for providing an estimation of a vehicle geometry of a surrounding vehicle.

Additionally, the disclosure relates to a vehicle comprising such a system.

Furthermore, the disclosure is directed to a computer-readable medium comprising instructions which, when executed by a computer, cause the computer to carry out such a method.

Such methods, systems and computer-readable mediums are used in vehicles being able to drive autonomously. Furthermore, they can be used in vehicles having a human driver in order to assist this human driver in driving.

In both scenarios, i.e. autonomous driving and assisted driving, it is essential for the so-called ego-vehicle or first vehicle to have information about the surrounding vehicles which are potential obstacles. For this reason, vehicles are equipped with corresponding sensor units comprising for example an optical camera, a radar device, an ultrasonic unit or a lidar unit. The surroundings of the ego-vehicle are continuously monitored by the sensor unit and the sensor measurements are converted into object information describing the surrounding vehicle.

It is an object of the present disclosure, to improve this kind of object information.

The problem is at least partially solved or alleviated by the subject matter of the independent claims of the present disclosure, wherein further examples are incorporated in the dependent claims.

According to a first aspect, there is provided a method for providing an estimation of a vehicle geometry of a surrounding vehicle, comprising: receiving an image of at least a portion of the surrounding vehicle, the portion comprising a license plate affixed to the surrounding vehicle, detecting the license plate within the received image and extracting the alphanumeric identification code of the license plate, requesting a vehicle geometry parameter being linked to the alphanumeric identification code from a database via a wireless data connection, receiving the vehicle geometry parameter from the database via the wireless data connection, and estimating the vehicle geometry based on the received vehicle geometry parameter.

The received image usually has the form of image data, i.e. computer-readable data containing information about the content of the image.

The received image may have been captured by a vision sensor unit, for example comprising an optical camera, a radar device, an ultrasonic unit, a lidar unit etc. In this context, the image can be standing or moving. If the image is moving, it may as well be a sequence of standing image frames.

It is to be noted that steps of the method are performed automatically, i.e. by a data processing device.

The method according to the present disclosure has the advantage that a very stable, robust and accurate estimation of the vehicle geometry can be provided. This is due to the fact, that methods relying only on information being detected by the vision sensor unit mounted on the ego-vehicle have to deal with a potentially limited field of view of the sensor unit. This means that objects, e.g. surrounding vehicles, being occluded by other objects, e.g. other surrounding vehicles, cannot be detected. Furthermore, depending on the relative position between the vision sensor unit and the detected surrounding vehicle, the estimation of the vehicle geometry may be distorted. In contrast thereto, using a vehicle geometry parameter from a database as a basis for a geometry estimation is very accurate since this parameter is not subject to detection errors, e.g. distortion. Moreover, the vehicle geometry parameter received from the database is always complete. Thus, the occlusion of the detected object does not have a negative influence.

To this end, the database comprises at least one entry comprising the alphanumeric identification code and at least one entry comprising a corresponding vehicle geometry parameter. This is for example the case for an official vehicle registration database. Of course, it is also possible to provide this data in a private database.

The license plate detection algorithm can use known detection algorithms e.g. a Maximally Stable Extremal Region (MSER) algorithm or a neural network-based deep learning detection algorithms to localize the license plate in an image frame and extract the alphanumeric identification code.

The data querying and the data retrieval may use a secure standard transmission protocol such as TLS 1.2. Additionally or alternatively, the database may be securely stored in the cloud with strict access control. Moreover, the vehicle geometry parameter being received from the database may be encrypted and visible to a local cache for the short-term tracking purpose only, without storing the actually received vehicle geometry parameter.

The estimation may be provided for a first vehicle, wherein the surrounding vehicle is within a field-of-view of the first vehicle. Thus, the surrounding vehicle whose geometry is to be estimated by the method according to the present disclosure may be located in the surroundings or environment of the first vehicle which can also be designated an ego-vehicle. The ego-vehicle can drive autonomously or at least is able to assist a human driver in driving. This means that the method according to the present disclosure may be performed on the ego-vehicle. Of course, it is possible to perform more than one of these methods on the ego-vehicle at the same time, e.g. one method for each surrounding vehicle being detected.

In the present disclosure, the vehicle geometry parameter may comprise at least one of a vehicle type identifier, a vehicle model identifier and a vehicle dimension parameter. A vehicle type identifier is to be understood as an information, e.g. a code, about the type of the vehicle, e.g. truck, passenger car, motorbike. A vehicle model identifier is to be understood as an information relating to the manufacturer of the vehicle and the specific model within the program of the manufacturer. A vehicle dimension parameter is for example a length, a width or a height of the surrounding vehicle. Of course, also more complex vehicle dimension parameters may be used, e.g. a bounding box containing the vehicle. It is noted that the vehicle dimension parameters may be actual measurements or simplifications thereof.

Generally speaking, a vehicle geometry parameter is defined as an alpha-numeric string that either comprises an information about the vehicle geometry or from which an information about a vehicle geometry can be derived.

It is to be noted, that for the present disclosure, a vehicle geometry parameter may also comprise a set of vehicle geometry parameters. Such a set for example comprises a length, a height and a width of a surrounding vehicle.

The alphanumeric identification code may be used as an identifier for tracking the vehicle. This means that the alphanumeric identification code of the license plates is used to relate a surrounding vehicle being detected in subsequent image frames to the respective previous one, thereby also transforming the corresponding estimation of the vehicle geometry, e.g. a bounding box, to the new frame. Compared to known identifiers, the alphanumeric identification code of the license plate is unique, at least within one jurisdiction. It is also important to note that the license plate is not subject to changes. Consequently, the problem of ID-switching cannot occur. Thus, the detection performance is improved.

The surrounding vehicle may additionally be detected in the received image by performing an object detection method on the received image. This further enhances the detection performance The object detection method may be a deep learning method performed by a trained learning algorithm configured to determine an object based on labeled data from supervised training.

Furthermore, it is possible that an additional vehicle geometry parameter is extracted from the detected surrounding vehicle in the received image. Thus, at least two more vehicle geometry parameters are available for the method. Thus the method can provide a comparatively exact estimation of the vehicle geometry. The additional vehicle geometry parameter being extracted from the detected image can also serve as a fallback solution if the connection to the database is not available. The additional vehicle geometry parameter may also be a vehicle dimension parameter. The additional vehicle geometry parameter thus may relate to a length, a width or a height of the surrounding vehicle. It is also possible that the additional vehicle geometry parameter comprises data describing a bounding box of the detected surrounding vehicle.

Again, the additional vehicle geometry parameter is to be understood such that it can also comprise a set of vehicle geometry parameters.

Moreover, the vehicle geometry parameter received from the database and the additional vehicle geometry parameter may be combined. This enhances the detection performance of the method. If, for example, one of the parameters is erroneous, this does not necessarily lead to an erroneous estimation of the vehicle geometry since the error can be compensated by the respective other parameter.

The combination of the vehicle geometry parameter received from the database and the additional vehicle geometry parameter may also be designated a parameter fusion.

The method may determine whether a vehicle geometry parameter being associated with the extracted alphanumeric identification code has been previously retrieved from the database. If this is the case, it may be considered unnecessary to retrieve the same vehicle geometry parameter again. In other words, the method may be performed only the first time an alphanumeric identification code has been detected. Thus, the method may be triggered only if a new license plate is detected. This renders the method efficient from a computational perspective.

According to a second aspect, there is provided a system for providing an estimation of a vehicle geometry of a surrounding vehicle. The system comprises a data processing device being connectable to a vision sensor unit for receiving an image from the vision sensor unit. The data processing device has a license plate detection unit configured for detecting a license plate within an image received from the vision sensor unit. Moreover, the data processing device comprises a character recognition unit being configured for extracting the alphanumeric identification code of the license plate being detected within the received image by the license plate detection unit. Additionally, a vehicle geometry estimation unit is provided, being configured for providing an estimation of a vehicle geometry. The system also has a communication unit being connected to the data processing device and being configured for exchanging data with a database via a wireless data connection. Thus, the vehicle geometry may be estimated with high accuracy and reliability. As has already been explained in connection with the method according to the present disclosure, this is also the case for surrounding vehicles being at least partly occluded.

The vision sensor unit may comprise an optical camera, a radar device, an ultrasonic unit, a lidar unit etc.

At least some of the units of the system may be software units.

The data processing device may also comprise a license plate tracking unit being configured for tracking the license plate. Consequently, the vehicle to which the license plate is affixed, can be tracked using the license plate. This offers an excellent tracking reliability since the license plate is unique, at least within one jurisdiction. Consequently, tracking inaccuracies relating to ID-switching excluded.

The data processing device may further comprise a vehicle detection unit being configured for detecting a surrounding vehicle in an image received from the vision sensor unit, a vehicle tracking unit being configured for tracking the vehicle, and an additional vehicle geometry estimation unit being configured for extracting an additional estimation of a vehicle geometry from the surrounding vehicle detected in the received image. Consequently, the surrounding vehicle may additionally be tracked without using the license plate. Moreover, a vehicle geometry can additionally be estimated from the received image. The data processing device thus offers two separate possibilities for detecting the surrounding vehicle and for estimating the corresponding vehicle geometry. In other words, the data processing device is redundant in these aspects and therefore operationally robust.

The data processing device can additionally comprise a fusion unit being configured for combining a vehicle geometry parameter received from the database via the communication unit and an additional vehicle geometry parameter being extracted from the received image by the additional vehicle geometry estimation unit. Thus an enhanced detection performance can be provided.

Moreover, the system may comprise a vision sensor unit configured for capturing an image of a portion of the vehicle. The vision sensor unit is connected to the data processing device in order to transfer the captured image thereto. Consequently, images of the comprising the surrounding vehicle can be captured in a simple and reliable manner.

The system may additionally comprise a database comprising at least one vehicle geometry parameter being linked to the alphanumeric identification code of the license plate, the database being linked to the communication unit via a wireless data connection. Consequently, vehicle geometry parameters of high quality are available.

According to a third aspect, there is provided a vehicle comprising a system according to the present disclosure. The vehicle comprising the system may be designated an ego-vehicle. Thus, the ego-vehicle is able to estimate a geometry of a surrounding vehicle being located in its environment with high precision.

According to a fourth aspect, there is provided a computer-readable medium comprising instructions which, when executed by a computer, cause the computer to carry out the method according to the present disclosure. This computer-readable medium provides the same effects and advantages that have already been described in connection with the method of the present disclosure.

The method of the present disclosure may be at least partly computer-implemented, and may be implemented in software or in hardware, or in software and hardware. Further, the method may be carried out by computer program instructions running on means that provide data processing functions. The data processing device may be a suitable computing means, such as an electronic control module etc., which may also be a distributed computer system. The data processing device or the computer, respectively, may comprise one or more of a processor, a memory, a data interface, or the like.

It should be noted that the above examples may be combined with each other irrespective of the aspect involved. Accordingly, the method may be combined with structural features and, likewise, the system may be combined with features described above with regard to the method.

These and other aspects of the present invention will become apparent from and elucidated with reference to the examples described hereinafter.

Examples of the invention will be described in the following with reference to the following drawings.

Figure 2:
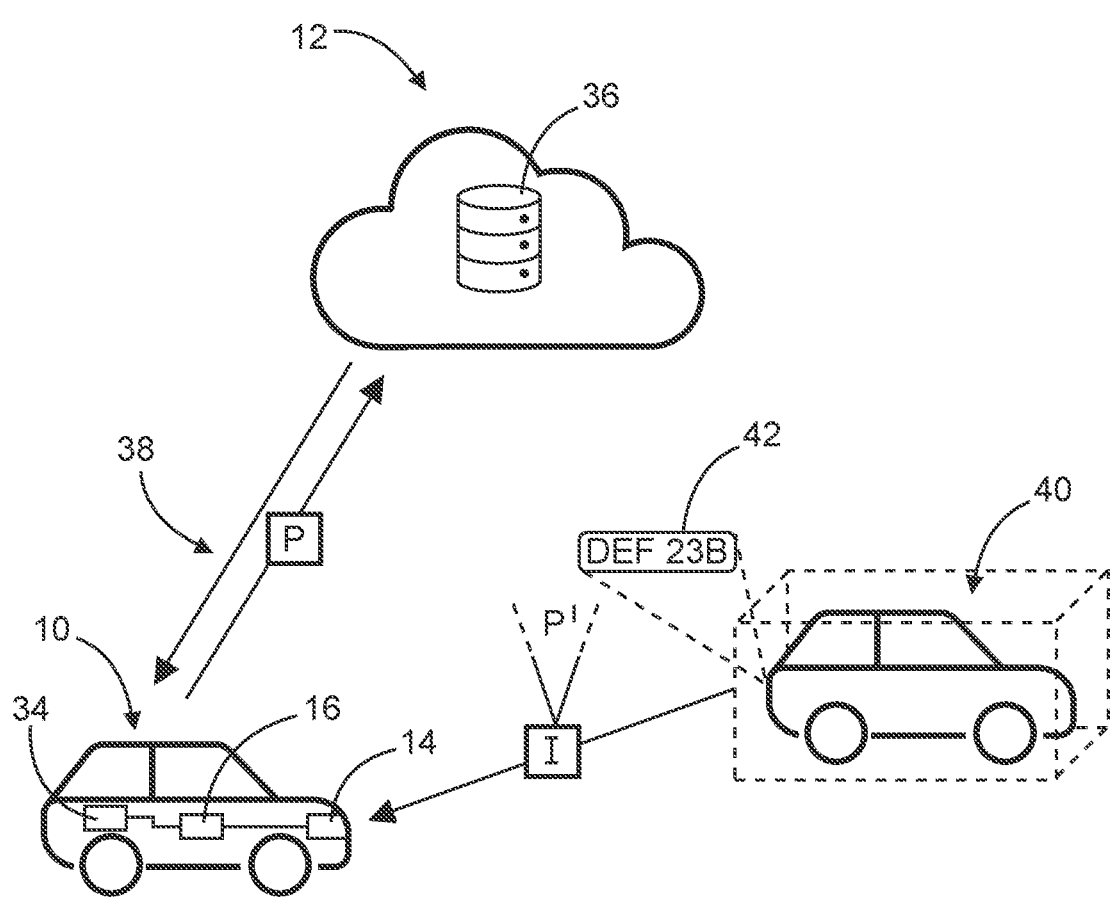
Figure 3:
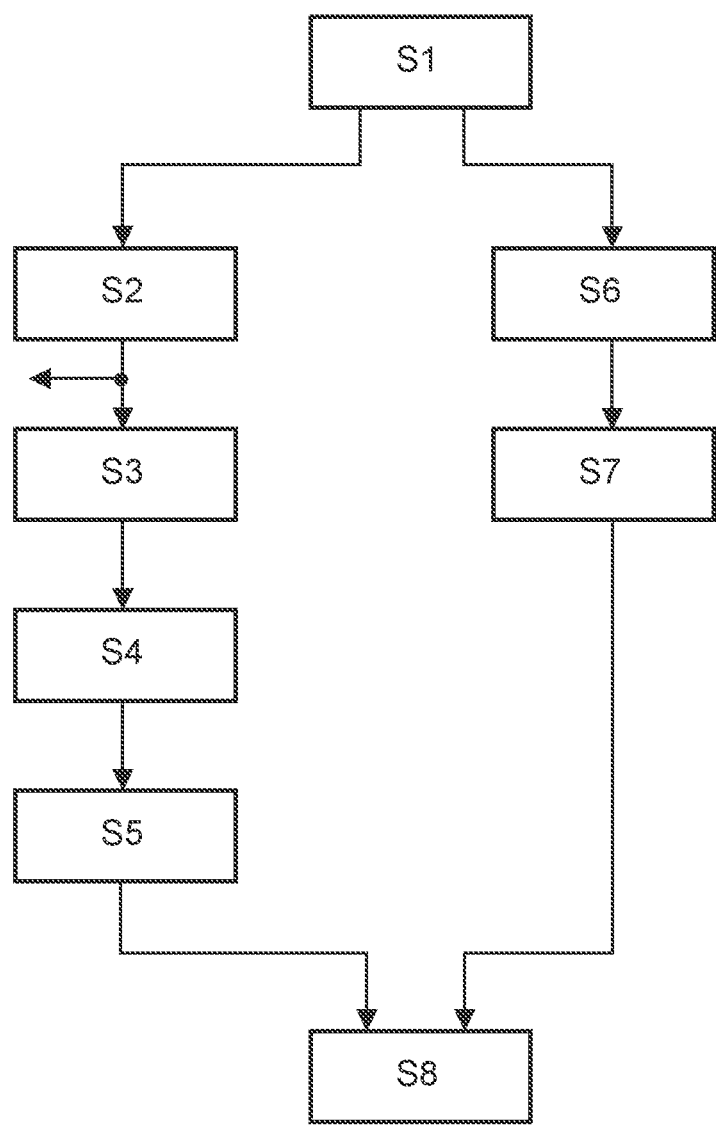

FIG. 1 shows a vehicle according to the present disclosure comprising a system according to the present disclosure and a computer-readable medium according to the present disclosure, and being able to perform a method for providing an estimation of a vehicle geometry of a surrounding vehicle according to the present disclosure, FIG. 2 shows the vehicle of FIG. 1 during operation, and FIG. 3 schematically shows the method for providing an estimation of a vehicle geometry of a surrounding vehicle according to the present disclosure.

The figures are merely schematic representations and serve only to illustrate examples of the invention. Identical or equivalent elements are in principle provided with the same reference signs.

FIG. 1 shows a vehicle 10 comprising a system 12 for providing an estimation of a vehicle geometry of a surrounding vehicle 40 (only shown in FIG. 2).

The system 12 comprises a vision sensor unit 14 which is configured for capturing an image I of the surrounding vehicle 40. In the present example the vision sensor unit 14 is an optical camera unit.

Moreover, the system 12 comprises a data processing device 16 being connected to the vision sensor unit 14. The connection between the data processing device 16 and the vision sensor unit 14 is configured such that the image I captured by the vision sensor unit 14 can be transferred to the data processing device 16.

The data processing device 16, thus, is configured for receiving the image I from the vision sensor unit 14.

In the following, it is assumed that the image I captured by the vision sensor unit 14 comprises a portion of the surrounding vehicle 40, wherein the portion comprises a license plate 42 affixed to the surrounding vehicle 40 (cf. FIG. 2).

Furthermore, the data processing device 16 comprises a license plate detection unit 18 which is configured for detecting the license plate 42 within the image I received from the vision sensor unit 14.

Additionally, the data processing device 16 has a character recognition unit 20 being configured for extracting the alphanumeric identification code of the license plate 42.

Also, the data processing device 16 has a vehicle geometry estimation unit 22 which is configured for providing an estimation of a geometry of the surrounding vehicle 40.

The data processing device 16 also comprises a license plate tracking unit 24 for tracking the license plate 42 within a set of image frames.

The data processing device 16 is further equipped with a vehicle detection unit 26. The vehicle detection unit 26 is configured for detecting the surrounding vehicle 40 within the image I received from the vision sensor unit 14.

Additionally, the data processing device 16 has a vehicle tracking unit 28 which is configured for tracking the surrounding vehicle 40.

The data processing device 16 also has an additional vehicle geometry estimation unit 30 being configured for extracting an additional estimation of a vehicle geometry of the surrounding vehicle 40 detected by the vehicle detection unit 26 in the received image I.

The data processing device 16 additionally comprises a fusion unit 32 being configured for combining a vehicle geometry parameter being provided by the vehicle geometry estimation unit 22 and an additional vehicle geometry parameter being extracted from the received image I by the additional vehicle geometry estimation unit 30.

Moreover, the system 12 comprises a communication unit 34 being connected to the data processing device 16 and being configured for exchanging data with a database 36 via a wireless data connection 38 (cf. FIG. 2).

The system 12 is configured for performing a method for providing an estimation of the vehicle geometry of the surrounding vehicle 40. This will be explained with additional reference to FIGS. 2 and 3.

It is noted that to this end, a computer-readable medium is provided as a part of the data processing device 16. The computer-readable medium comprises instructions which, when executed by a computer, cause the computer to carry out the method.

Moreover, to this end the system 12 additionally comprises a database 36 comprising at least one vehicle geometry parameter being linked to the alphanumeric identification code of the license plate 42.

The database 36 does not form part of the vehicle 10.

However, the database 36 is linked to the communication unit 34 of the vehicle 10 via the wireless data connection 38.

As an input for the method for providing an estimation of a vehicle geometry of the surrounding vehicle 40, the image I is captured by the vision sensor unit 14. The image I comprises at least a portion of the surrounding vehicle 40 comprising its license plate 42.

This image I is received by the data processing device 16 (step S1 in FIG. 3).

Then, the license plate 42 is detected within the received image I by the license plate detection unit 18 and the corresponding alphanumeric identification code is extracted by the character recognition unit 20 (step S2 in FIG. 3).

In more detail, for the surrounding vehicle 40 the alphanumeric identification code DEF23B is extracted (cf. FIG. 2).

Subsequently, an evaluation is made whether a database request has already been performed in connection with this specific alphanumeric identification code. If so, the method can be abandoned.

If not, the method is continued and a vehicle geometry parameter P being linked to the alphanumeric identification code is requested from the database 36 via the wireless data connection 38 (step S3 in FIG. 3).

The communication unit 34 is used in order to perform this step.

Provided that such a vehicle geometry parameter P is available on the database 36 for the specific alphanumeric identification code, the database 36 answers the request by providing this vehicle geometry parameter P.

For illustrative purposes only, the vehicle geometry parameter P may be a parameter set comprising a length, a width and a height of the surrounding vehicle 40.

Thus, the data processing device 16 receives the vehicle geometry parameter P from the database 36 via the wireless data connection 38 (step S4 in FIG. 3).

Again, the communication unit 34 is used for transmitting the vehicle geometry parameter P from the database 36 to the data processing device 16.

In more detail, the vehicle geometry parameter P is transferred to the geometry estimation unit 22.

Within the geometry estimation unit 22, the vehicle geometry parameter P is used either directly as an estimation of the vehicle geometry or it is used as an input parameter for generating such an estimation of the vehicle geometry.

In summary, an estimation of the vehicle geometry of the surrounding vehicle 40 is provided by requesting a vehicle geometry parameter P from the database 36 using the alphanumeric identification code of the license plate 42 as an index.

Additionally, an object detection method may be performed on the image I captured by the vision sensor unit 14 which is received in the data processing device 16, more precisely in the vehicle detection unit 26. Within the image I, thus, at least the surrounding vehicle 40 is detected (Step S6 in FIG. 3).

Based on this, by the additional vehicle geometry estimation unit 30, an additional vehicle geometry parameter P' is derived from the image I (step S7 in FIG. 3).

For illustrative purposes, it may again be assumed, that the values for the length, the width and the height of the surrounding vehicle 40 are extracted from the image I.

The vehicle geometry parameter P, i.e. the surrounding vehicle's height, width and length having been received from the database 36 and the additional vehicle geometry parameter P', i.e. the surrounding vehicle's height, width and length having been extracted from the image I, may then be combined or fused in the fusion unit 32 (step S8 in FIG. 3).

In this context, for example the corresponding values for the length, the height and the width are compared and always the bigger value is used for estimating the geometry of the surrounding vehicle 40.

Moreover, the alphanumeric identification code is used as an identifier for the surrounding vehicle 40 detected in the received image I and based on this, the surrounding vehicle 40 is tracked within a set of image frames.

Other variations to the disclosed examples can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 vehicle
12 system for providing an estimation of a vehicle geometry of a surrounding vehicle
14 vision sensor unit
16 data processing device
18 license plate detection unit
20 character recognition unit
22 vehicle geometry estimation unit
24 license plate tracking unit
26 vehicle detection unit
28 vehicle tracking unit
30 additional vehicle geometry estimation unit
32 fusion unit
34 communication unit
36 database
38 wireless data connection
40 surrounding vehicle
42 license plate
P vehicle geometry parameter
P' additional vehicle geometry parameter
I image

The invention claimed is:

1. A method, comprising
capturing, by a system comprising a processor or a first vehicle, via a sensor of the first vehicle, an image of at least a portion of a second vehicle in surroundings of the first vehicle, wherein the portion comprises a license plate affixed to the second vehicle;
detecting, by the system, the license plate within the image;
extracting, by the system, an alphanumeric identification code of the license plate from the image;
requesting, by the system, via a wireless data connection with a cloud storage device comprising a database storing vehicle geometry parameters of vehicles respectively linked to alphanumeric identification codes of license plates, a vehicle geometry parameter of the second vehicle linked to the alphanumeric identification code from the database;
receiving, by the system, via the wireless data connection, the vehicle geometry parameter; and
estimating, by the system, a vehicle geometry of the second vehicle based on the vehicle geometry parameter, wherein the vehicle geometry comprises a bounding box containing the second vehicle that is employed by the first vehicle for autonomous driving of the first vehicle or assisting a human driver in driving the first vehicle.

2. The method according to claim 1, wherein the vehicle geometry parameter comprises at least one of a vehicle type identifier, a vehicle model identifier, or a vehicle dimension parameter.

3. The method according to claim 1, wherein the alphanumeric identification code is used as an identifier for tracking the second vehicle.

4. The method according to claim 1, wherein the second vehicle is detected in the image by performing an object detection method on the image.

5. The method according to claim 4, further comprising extracting, by the system, an additional vehicle geometry parameter from the second vehicle in the image.

6. The method according to claim 5, wherein estimating the vehicle geometry of the second vehicle comprises combining the vehicle geometry parameter and the additional vehicle geometry parameter.

7. The method according to claim 1, further comprising:
prior to requesting vehicle geometry parameter, determining, by the system, whether the alphanumeric identification code has been previously employed by the first vehicle to request the vehicle geometry parameter.

8. A system, comprising:
a memory configured to store computer executable instructions; and
a processor configured to execute at least one of the computer executable instructions that:
captures, via a sensor of a first vehicle, an image of at least a portion of a second vehicle in surroundings of the first vehicle, the portion comprising a license plate affixed to the second vehicle
detects the license plate within the image;
extracts an alphanumeric identification code of the license plate from the image
requests, via a wireless data connection with a cloud storage device comprising a database storing vehicle geometry parameters of vehicles respectively linked to alphanumeric identification codes of license plates, a vehicle geometry parameter of the second vehicle linked to the alphanumeric identification code from the database;
receiving, via the wireless data connection, the vehicle geometry parameter; and
estimating of a vehicle geometry of the second vehicle based on the vehicle geometry parameter, wherein the vehicle geometry comprises a bounding box containing the second vehicle that is employed by the first vehicle for autonomous driving of the first vehicle or assisting a human driver in driving the first vehicle.

9. The system according to claim 8, wherein the vehicle geometry parameter comprises at least one of a vehicle type identifier, a vehicle model identifier, or a vehicle dimension parameter.

10. The system according to claim 8, wherein the at least one of the computer executable instructions further:
extracts an additional vehicle geometry parameter from the second vehicle in the image.

11. The system according to claim 10, wherein estimating the vehicle geometry of the second vehicle comprises combining the vehicle geometry parameter and the additional vehicle geometry parameter.

12. A first vehicle,
a memory configured to store computer executable instructions; and
a processor configured to execute at least one of the computer executable instructions that:
detects the license plate within the image;
extracts an alphanumeric identification code of the license plate from the image
requests, via a wireless data connection with a cloud storage device comprising a database storing vehicle geometry parameters of vehicles respectively linked to alphanumeric identification codes of license plates, a vehicle geometry parameter of the second vehicle linked to the alphanumeric identification code from the database;
receiving, via the wireless data connection, the vehicle geometry parameter; and
estimating of a vehicle geometry of the second vehicle based on the vehicle geometry parameter, wherein the vehicle geometry comprises a bounding box containing the second vehicle that is employed by the first vehicle for autonomous driving of the first vehicle or assisting a human driver in driving the first vehicle.

13. A non-transitory computer-readable medium comprising instructions which, when executed by a processor of the first vehicle, cause the processor to perform operations, comprising:
capturing, via a sensor of the first vehicle, an image of at least a portion of a second vehicle in surroundings of the first vehicle, wherein the portion comprises a license plate affixed to the second vehicle;
detecting the license plate within the image;
extracting an alphanumeric identification code of the license plate from the image;
requesting, via a wireless data connection with a cloud storage device comprising a database storing vehicle geometry parameters of vehicles respectively linked to alphanumeric identification codes of license plates, a vehicle geometry parameter linked to the alphanumeric identification code from the database;
receiving, via the wireless data connection, the vehicle geometry parameter of the second vehicle; and
estimating a vehicle geometry of the second vehicle based on the vehicle geometry parameter, wherein the vehicle geometry comprises a bounding box containing the second vehicle.

14. The non-transitory computer-readable medium according to claim 13, wherein the vehicle geometry parameter comprises at least one of a vehicle type identifier, a vehicle model identifier, or a vehicle dimension parameter.

15. The non-transitory computer-readable medium according to claim 13, wherein the operations further comprise extracting an additional vehicle geometry parameter from the second vehicle in the image.

16. The non-transitory computer-readable medium according to claim 15, wherein estimating the vehicle geometry of the second vehicle comprises combining the vehicle geometry parameter and the additional vehicle geometry parameter.

17. The first vehicle according to claim 12, wherein the vehicle geometry parameter comprises at least one of a vehicle type identifier, a vehicle model identifier, or a vehicle dimension parameter.

18. The first vehicle according to claim 12, wherein the at least one of the computer executable instructions further:
extracts an additional vehicle geometry parameter from the second vehicle in the image.

19. The first vehicle according to claim 18, wherein estimating the vehicle geometry of the second vehicle comprises combining the vehicle geometry parameter and the additional vehicle geometry parameter.

20. The first vehicle according to claim 19, wherein vehicle geometry parameter comprises at least one of a first length of the second vehicle, a first width of the second vehicle, and a first height of the second vehicle, and wherein the additional vehicle geometry parameter comprises at least one of a second length of the second vehicle, a second width of the second vehicle, or a second height of the second vehicle.

\* \* \* \* \*